(12) United States Patent
Hackl et al.

(10) Patent No.: US 11,276,999 B2
(45) Date of Patent: Mar. 15, 2022

(54) MULTISTAGE PROTECTIVE DEVICE FOR OVERCURRENT- AND OVERVOLTAGE-PROTECTED TRANSMISSION OF ELECTRICAL ENERGY

(71) Applicant: Phoenix Contact GmbH & Co. KG, Blomberg (DE)

(72) Inventors: Yves Hackl, Hameln (DE); Simon-Immanuel Gries, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 16/973,492

(22) PCT Filed: May 22, 2019

(86) PCT No.: PCT/EP2019/063240
§ 371 (c)(1),
(2) Date: Dec. 9, 2020

(87) PCT Pub. No.: WO2019/238370
PCT Pub. Date: Dec. 19, 2019

(65) Prior Publication Data
US 2021/0249851 A1   Aug. 12, 2021

(30) Foreign Application Priority Data

Jun. 13, 2018   (BE) .................................. 2018/5390

(51) Int. Cl.
*H02H 3/10*   (2006.01)
*H02H 1/00*   (2006.01)

(52) U.S. Cl.
CPC ............ *H02H 3/10* (2013.01); *H02H 1/0007* (2013.01)

(58) Field of Classification Search
CPC ............ H01H 2085/466; H01H 83/20; H01H 85/0241; H01H 85/46; H01H 85/463;
(Continued)

(56) References Cited

U.S. PATENT DOCUMENTS 6,331,763 B1   12/2001   Thomas et al.
9,401,593 B2   7/2016   Gascuel
(Continued)

FOREIGN PATENT DOCUMENTS

DE   3831935 A1   3/1990
DE   102006057249 A1   6/2008
(Continued)

OTHER PUBLICATIONS

Notice of Reasons for Refusal re: Japanese Patent Application No. 2020-567608; Reiwa 4(2022) dated Jan. 2019; Patent Business Corporation YKI International Patent Office; Article 29 (1) (iii) (Novelty) Article 29 (2).

*Primary Examiner* — Jared Fureman
*Assistant Examiner* — Nicolas Bellido
(74) *Attorney, Agent, or Firm* — Holland & Hart LLP

(57) ABSTRACT

A protective device includes a first fuse circuit, an overvoltage protection circuit, and a second fuse circuit. The first fuse circuit prevents a flow of a line current from a voltage terminal to the electrical load when the line current reaches a first nominal current. The overvoltage protection circuit is connected downstream of the first fuse circuit and upstream of the electrical load, and is adapted to electrically connect two poles of the voltage terminal when a voltage at the voltage terminal reaches a first voltage limit to force the line current to the first nominal current such that the first fuse circuit is triggered. The second fuse circuit is connected downstream of the overvoltage protection circuit and upstream of the electrical load, and prevents flow of the line
(Continued)

current when the line current reaches a second nominal current, wherein the second nominal current is based on the electrical load.

10 Claims, 2 Drawing Sheets

(58) Field of Classification Search
CPC .... H02H 1/0007; H02H 1/0038; H02H 3/023; H02H 3/027; H02H 3/033; H02H 3/08; H02H 3/087; H02H 3/10; H02H 3/20; H02H 3/202; H02H 3/22; H02H 5/041; H02H 5/046; H02H 7/1213; H02H 7/1252; H02H 9/02; H02H 9/04; H02H 9/041; H02H 9/042; H02M 1/32; H03K 17/0828
See application file for complete search history.

(56) References Cited

U.S. PATENT DOCUMENTS

| | | | | |
|---|---|---|---|---|
| 2004/0027754 A1* | 2/2004 | Freyman | ................. | H04M 3/18 |
| | | | | 361/91.1 |
| 2007/0103834 A1* | 5/2007 | Huang | ................. | H02J 7/0031 |
| | | | | 361/104 |
| 2010/0188785 A1* | 7/2010 | Gascuel | ................. | H02H 3/033 |
| | | | | 361/18 |
| 2021/0257827 A1* | 8/2021 | Blanke | ................... | H02H 3/087 |

FOREIGN PATENT DOCUMENTS

| | | | | |
|---|---|---|---|---|
| DE | 112013007534 T5 | 7/2016 | | |
| DE | 102017109378 A1 | 8/2018 | | |
| JP | 2007043822 A | * | 2/2007 | ............ H02H 3/023 |
| JP | 2012-516669 A | 7/2012 | | |

* cited by examiner

MULTISTAGE PROTECTIVE DEVICE FOR OVERCURRENT- AND OVERVOLTAGE-PROTECTED TRANSMISSION OF ELECTRICAL ENERGY

CROSS-REFERENCE TO RELATED APPLICATIONS

The present application is the national phase entry under 35 U.S.C. § 371 of International Patent Application No. PCT/EP2019/063240 by Hackl, entitled "MULTISTAGE PROTECTIVE DEVICE FOR OVERCURRENT- AND OVERVOLTAGE-PROTECTED TRANSMISSION OF ELECTRICAL ENERGY," filed May 22, 2019; and claims the benefit of Belgian Patent Application No. BE2018/5390 by Hackl, entitled "MEHRSTUFIGE SCHUTZVORRICH-TUNG ZUR ÜBERSTROM- UND ÜBERSPAN-NUNGSGESICHERTEN ÜBERTRAGUNG VON ELEKTRISCHER ENERGIE," filed Jun. 13, 2018, each of which is assigned to the assignee hereof and is incorporated by reference in its entirety.

FIELD OF THE DISCLOSURE

The present disclosure relates to a protective device for the overcurrent- and overvoltage-protected transmission of electrical energy from a voltage terminal to an electrical load.

BACKGROUND

Protective devices for limiting a current strength, a voltage and/or a power are usually used in isolation amplifiers in order to protect downstream electrical components from current strengths, voltages and/or powers above a respectively predetermined limit. Correspondingly, the maximum nominal data of electrical components which are connected downstream of the protective device can advantageously be reduced. The protective device can also be used to safely disconnect an electrical load from the voltage terminal in order to meet the requirements of explosion protection.

The protective device typically has an overcurrent protection and overvoltage protection connected downstream of the overcurrent protection. The overvoltage protection can short-circuit the voltage when a voltage limit is reached, so that a short-circuit current flows through the overcurrent protection, which can subsequently be triggered when a nominal current is reached in order to interrupt the flow of current. Disadvantageously, it may be necessary to dimension the downstream electrical components according to the nominal current and/or according to the voltage limit. Accordingly, the electrical components can have increased component dimensions and increased nominal currents and/or increased nominal voltages that are not necessary for operation below the nominal current and/or voltage limit.

SUMMARY

It is the object of the present disclosure to provide a more efficient protective device which enables electrical components to be connected downstream of the protective device which can be adapted for lower maximum nominal currents than it is possible with conventional protective devices.

This object is achieved by the features of the independent claim. Advantageous implementations are the subject matter of the dependent claims, the description and the accompanying figures.

The present disclosure is based on the knowledge that the above object can be achieved by a protective device which, in addition to a first overcurrent protection and an overvoltage limiter, has an additional overcurrent protection. In particular, a second fuse can be connected downstream of a first fuse which triggers at a lower nominal current than the first fuse. As a result, the electrical load can also be protected from overcurrents which are smaller than the short-circuit current caused by the overvoltage device. The first overvoltage limiter and the additional overcurrent protection can be a clamping circuit which can be triggered by two separate voltage limit switches, in particular different sized Z-diodes.

According to a first aspect, the disclosure relates to a protective device for the overcurrent- and overvoltage-protected transmission of electrical energy from a voltage terminal to an electrical load, wherein the voltage terminal comprises two poles. The protective device comprises a first fuse circuit which is adapted to prevent the flow of a line current from the voltage terminal to the electrical load when said line current reaches a first nominal current. Furthermore, the protective device comprises an overvoltage protection circuit, which is connected downstream of the first fuse circuit and upstream of the electrical load. The overvoltage protection circuit is adapted to connect the poles of the voltage terminal in an electrically low-resistance manner when a voltage reaches a first voltage limit at the voltage terminal, in order to force a line current which reaches the first nominal current to trigger the first fuse circuit. Furthermore, the protective device comprises a second fuse circuit, which is connected downstream of the overvoltage protection circuit and is connected upstream of the electrical load. The second fuse circuit is adapted to prevent the flow of the line current when said line current reaches a second nominal current. The second nominal current depends on the electrical load.

In one example, the second nominal current is smaller than the first nominal current in order to prevent a current flow with a correspondingly lower short-circuit current strength to the electrical load.

The protective device can be a combination of an overcurrent protection and a clamping circuit (crowbar), with which an electrical load can be secured against the flow of an electrical current with a current strength above a current strength permissible for the electrical load and/or the presence of a voltage above a maximum voltage permissible for the electrical load. In particular, a maximum electrical power which the consumer can convert can also be defined in combination with the limitation of the current strength and the voltage.

Furthermore, the protective device can be arranged, for example, in a signal input of an isolation amplifier in order to be able to reduce the maximum nominal data of downstream electrical components. Furthermore, the protective device can form explosion protection in order to enable the downstream electrical components to be operational in an explosive environment and/or atmosphere.

The protective device can be connected downstream of an energy feed of an electrical load in order to be able to expect predetermined current strength, voltage and/or power values after the protective device. Accordingly, electronic circuits connected downstream of the protective device can have smaller air and/or creepage distances, since a reduced voltage and/or current strength level can be expected.

With the arrangement of a second fuse circuit after the first fuse circuit, the advantage can be achieved that the electrical parameters, in particular the maximum nominal current, can be set more flexibly between electronic components which are connected downstream of the second fuse circuit. The second fuse circuit can be adapted as a chip fuse which has reduced component dimensions compared to the first fuse circuit. Furthermore, electrical components which are connected downstream of the second fuse circuit can have reduced component dimensions and/or reduced performance data compared to an arrangement downstream of the first fuse circuit.

The voltage terminal for the fuse circuit can in particular be formed by a circuit which is arranged between an energy supply network and the fuse circuit. This intermediate stage can be, for example, a switched-mode power supply and/or a voltage converter.

The second nominal current can be smaller than the first nominal current. In particular, if a voltage transformation of the voltage of the voltage terminal is not provided between the first fuse circuit and the second fuse circuit, electrical loads connected downstream of the second fuse circuit can have lower nominal currents and can be produced correspondingly more cost-effectively and/or smaller.

Furthermore, a voltage transformer can be arranged between the first fuse circuit and the second fuse circuit, which is adapted to increase or decrease the voltage of the voltage terminal. The voltage transformer can, for example, be adapted to reduce a voltage from 24 V to 5 V. Electrical loads connected downstream of the second fuse circuit can be adapted for a higher current strength than the first fuse circuit, so that the second nominal current is greater than the first nominal current.

The protective device can be a back-up fuse which is connected downstream of an energy feed in order to provide defined current strength, voltage and/or power values to electrical loads that are connected downstream of the protective device. Insulation distances between electrical components of an electrical load can in particular be adapted to a maximum voltage level, for example 50 V. The protective device can, for example, be followed by a switched-mode power supply which increases or decreases the output voltage of the energy supply. In particular, a voltage in the range of 20 V to 30 V can be reduced to a voltage of 3 V to 12 V. A downstream isolating element, for example a transformer, can accordingly be dimensioned for lower maximum voltages than would be possible using a conventional crowbar circuit.

The first fuse circuit can be adapted, for example, to prevent the flow of the line current in the event of a prospective short-circuit current of 1500 A and the overvoltage protection circuit limits the voltage to an adjustable voltage value, for example 18 V. Accordingly, the second fuse circuit can be adapted to prevent a line current from flowing with a current strength below the short-circuit current protected by the first fuse circuit. Correspondingly, parameters for the protection of downstream electronic circuits can be selected from a wide range of parameters, since the second fuse circuit can be implemented as a chip fuse and can accordingly be produced in a large number of designs. In particular, a protective device can thus be composed of electronic components which have a high level of availability on the market and can therefore be produced efficiently and inexpensively.

In one example, the second nominal current, which is in particular a second prospective short-circuit current, is smaller than the first nominal current, which is in particular a first prospective short-circuit current, and/or wherein the overvoltage protection circuit is adapted to reduce a nominal voltage of the second fuse circuit. This realizes the aforementioned advantages.

In one example, the first fuse circuit and the second fuse circuit each have an overcurrent protective device, in particular a fuse and/or a power circuit switch, wherein the overcurrent protective device is adapted to disconnect the electrical connection between the voltage terminal and the electrical load when the first nominal current or the second nominal current is reached or after a predetermined time interval after reaching the first nominal current or the second nominal current has passed.

The predetermined time interval can be determined by a trigger delay of the respective fuse, in which a wire element of the fuse is heated and melted by the current flow. The trigger delay of the overcurrent protection fuse in the first fuse circuit can be greater than the trigger delay of the overcurrent protection fuse in the second protection circuit. In particular, the first overcurrent protection fuse is used to subsequently disconnect the electrical connection between the voltage terminal and the electrical load after the semiconductor switch has switched. A line current with a current strength above the first nominal current, which triggers the first overcurrent protection fuse, flows via the semiconductor switch and thus not to the electrical load.

A protection of the electrical load against a line current with a current strength which could damage the electrical load can be implemented by the second overcurrent protective device. The second overcurrent protective device can therefore trigger more quickly and at a lower current strength than the first overcurrent protective device.

In one example, the first protective circuit and/or the second protective circuit are adapted to interrupt an electrical connection between the voltage terminal and the electrical load when a short-circuit current flows through the overvoltage protection circuit, in order to prevent the line current from flowing at a current strength above the first nominal current and/or above the second nominal current to the electrical load.

The electrical connection can be interrupted by means of a blocking semiconductor element, a mechanical switching contact or by means of a defined melting of the overcurrent protective device. Accordingly, the electrical connection can be disconnected in a reversible manner or, in the case of defined melting, in an irreversible manner. After the first protective circuit and/or the second protective circuit have been triggered, manual intervention may be necessary in order to put the circuit back into operation. For example, it may be necessary to replace one of the overcurrent protective devices and/or to remedy the cause of the overvoltage or the overcurrent.

In one example, the second fuse circuit has at least two current paths, which are each adapted to transmit electrical energy to an electrical load, wherein an overcurrent protective device is arranged in each of the current paths.

In one example, the overcurrent protective devices in the current paths are adapted to be triggered at different nominal currents in order to prevent a current flow in the respective current path.

In one example, the first fuse circuit and/or the second fuse circuit are adapted to detect a component and/or ambient temperature and, when the component and/or ambient temperature reaches a temperature limit, trigger the overvoltage protection circuit and/or prevent a current to flow from the voltage terminal to the electrical load. This has the advantage that the electrical load can be protected from thermal loads.

In one example, the second fuse circuit is adapted to provide the electrical load with a reduced maximum electrical power compared to the composite consisting of the first fuse circuit and the overvoltage protection circuit by limiting the line current to the second nominal current.

In one example, the overcurrent protective device can be connected downstream of the electrical load.

BRIEF DESCRIPTION OF THE DRAWINGS

Further examples are explained with reference to the accompanying figures.

DETAILED DESCRIPTION

Figure 1:
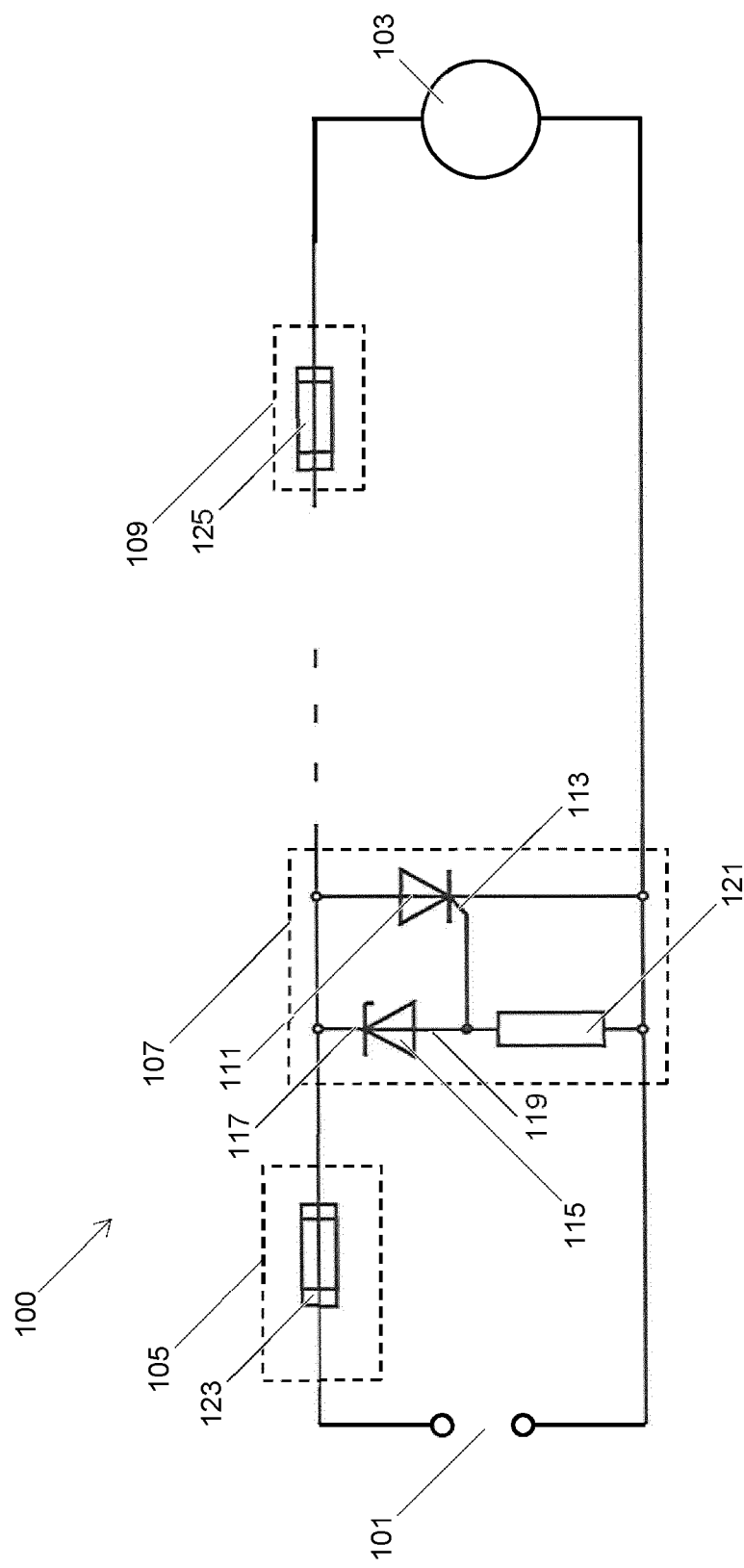
FIG. 1 shows an example of a protective device.

FIG. 1 shows a schematic representation of the protective device 100 for the overcurrent- and overvoltage-protected transmission of electrical energy from a voltage terminal 101 to an electrical load 103, wherein the voltage terminal 101 comprises two poles. The protective device 100 comprises a first fuse circuit 105, which is adapted to prevent the flow of a line current from the voltage terminal 101 to the electrical load 103 when said line current reaches a first nominal current strength limit.

The protective device 100 further comprises an overvoltage protection circuit 107, which is connected downstream of the first fuse circuit 105 and upstream of the electrical load 103. The overvoltage protection circuit 107 is adapted to connect the poles of the voltage terminal 101 in an electrically conductive manner when a voltage reaches a first voltage limit at the voltage terminal 101, in order to force a line current which reaches the first nominal current to trigger the first fuse circuit 105.

Furthermore, the protective device 100 comprises a second fuse circuit 109, which is connected downstream of the overvoltage protection circuit 107 and is connected upstream of the electrical load 103. The second fuse circuit 109 is adapted to prevent the line current from flowing when a second nominal current is reached by the line current. The second nominal current is smaller than the first nominal current.

The overvoltage protection circuit 107 comprises a semiconductor switch 111, in particular a thyristor, which is connected electrically in parallel to the poles of the voltage terminal 101 and has a control input 113. The semiconductor switch 111 is adapted to connect the poles of the voltage terminal 101 in an electrically conductive manner with a control signal applied to the control input 113 and to cancel the electrical connection of the poles of the voltage terminal 101 when the line current falls below the minimum current value.

The overvoltage device 107 further comprises a voltage limit switch 115, in particular a Z-diode with a switch input 117 and a switch output 119. The voltage limit switch 115 is connected downstream of the first fuse circuit 105 via the switch input 117 and is connected to the control input 113 of the semiconductor switch 111 via the switch output 119. Furthermore, the voltage limit switch 115 is adapted to provide the control signal at the switch output 119 when the first voltage limit is reached by the voltage at the voltage terminal 101.

The overvoltage protection circuit 107 further comprises a resistor 121, which is connected downstream of the switch output 119 of the voltage limit switch 115 and is arranged with the voltage limit switch 115 electrically parallel to the poles of the voltage terminal 101. The control input 113 is connected to the switch output 119 of the voltage limit switch 115 and the resistor 121, the resistor 121 being adapted to provide a control signal, in particular in the form of part of the voltage at the voltage terminal 101, when the voltage limit switch 115 is switched to the control input 113, in order to switch the semiconductor switch 111.

The first fuse circuit 105 and the second fuse circuit 109 each have an overcurrent protective device 123, 125, in particular a fuse. The overcurrent protective device 123 is adapted to disconnect the electrical connection between the voltage terminal 101 and the electrical load 103 when the first current strength limit is reached or to disconnect it after a predetermined time interval after the first nominal current has been reached. Correspondingly, the overcurrent device 125 is adapted to disconnect the electrical connection between the voltage terminal 101 and the electrical load 103 when the second nominal current is reached or after a predetermined time interval has passed after the second current strength limit has been reached.

Figure 2:
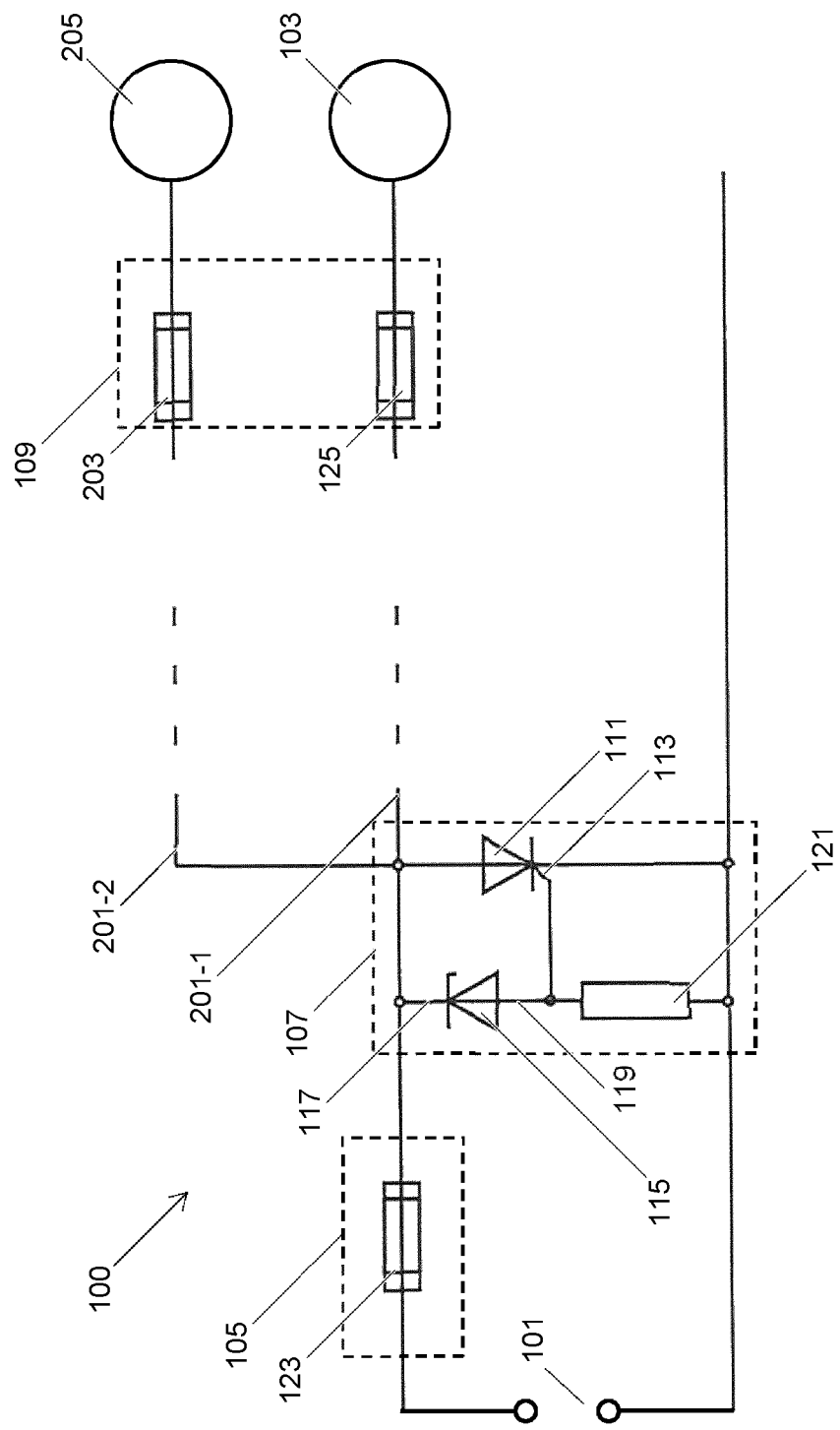
FIG. 2 shows an example of a protective device.

FIG. 2 shows a schematic representation of the protective device 100 for the transmission of electrical energy from a voltage terminal 101 to at least two electrical loads 103, 205. The protective device 100 comprises a first fuse circuit 105, which is adapted to prevent a flow of the line current when a first nominal current is reached by a line current from the voltage terminal 101 to the electrical loads 103, 205.

The protective device 100 further comprises an overvoltage protection circuit 107, which is connected downstream of the first fuse circuit 105 and is connected upstream of the electrical loads 103, 205. The overvoltage protection circuit 107 is adapted to connect the poles of the voltage terminal 101 in an electrically conductive manner when a first voltage limit of a voltage at the voltage terminal 101 is reached, in order to force a line current which reaches the first nominal current to trigger the first fuse circuit 105.

Furthermore, the protective device 100 comprises a second fuse circuit 109, which is connected downstream of the overvoltage protection circuit 107 and upstream of the electrical loads 103, 205. The second fuse circuit 109 has two current paths 201-1, 201-2, which are each adapted to transmit electrical energy to an electrical load 103, 205. An overcurrent protective device 125, 203 is arranged in each of the current paths 201-1, 201-2.

The overcurrent protection fuse 125 is adapted to prevent the current from flowing through the current path 201-1 when a second nominal current of a current flow through the current path 201-1 is reached. The overcurrent protective devices 203 are adapted to prevent the current from flowing through the current path 201-2 when a third nominal current of a current flow through the current path 201-2 is reached. The second nominal current and the third nominal current can each be less than the first nominal current. The overcurrent protective devices 125, 203 are adapted to trigger at different nominal currents in order to prevent a current flow in the respective current path 201-1, 201-2.

LIST OF REFERENCE NUMBERS 100 protective device
101 voltage terminal
103 electrical load
105 first fuse circuit
107 overvoltage protection circuit
109 second fuse circuit
111 semiconductor switches
113 control input
115 voltage limit switch
117 switch input
119 switch output 121 resistance
123 overcurrent protective device
125 overcurrent protective device
201-1 current path
201-2 current path
203 overcurrent protective device
205 electrical load

What is claimed is:

1. A protective device for overcurrent- and overvoltage-protected transmission of electrical energy from a voltage terminal to an electrical load, wherein the voltage terminal comprises two poles, the protective device comprising:
a first fuse circuit adapted to prevent a flow of a line current from the voltage terminal to the electrical load when said line current reaches a first nominal current;
an overvoltage protection circuit connected downstream of the first fuse circuit and upstream of the electrical load, wherein the overvoltage protection circuit is adapted to electrically connect the poles of the voltage terminal when a voltage at the voltage terminal reaches a first voltage limit to force the line current to the first nominal current such that the first fuse circuit is triggered; and
a second fuse circuit connected downstream of the overvoltage protection circuit and upstream of the electrical load, wherein the second fuse circuit is adapted to prevent the flow of the line current when said line current reaches a second nominal current, wherein the second nominal current is based at least in part on the electrical load.

2. The protective device according to claim 1, wherein the first nominal current is a first prospective short-circuit current and the second nominal current is a second prospective short-circuit current, wherein the second nominal current is smaller than the first nominal current, and wherein the overvoltage protection circuit is adapted to reduce a nominal voltage of the second fuse circuit.

3. The protective device according to claim 1, wherein the second nominal current is smaller than the first nominal current such that a current flow with a correspondingly lower short-circuit current strength to the electrical load is prevented.

4. The protective device according to claim 1, wherein the overvoltage protection circuit comprises a semiconductor switch electrically connected in parallel to the poles of the voltage terminal, wherein the semiconductor switch comprises a control input and is adapted to electrically connect the poles of the voltage terminal based on a control signal applied to the control input, and wherein the semiconductor switch is further adapted to disconnect an electrical connection of the poles of the voltage terminal when the line current falls below a minimum current value.

5. The protective device according to claim 4, wherein the semiconductor switch comprises a thyristor or a transistor.

6. The protective device according to claim 1, wherein each of the first fuse circuit and the second fuse circuit comprises an overcurrent protective device comprising one or more of: a fuse or a power switch, and wherein each respective overcurrent protective device is adapted to disconnect an electrical connection between the voltage terminal and the electrical load based at least in part on one or more of: the first nominal current or the second nominal current being reached or an elapsed a predetermined time interval after reaching the first nominal current or the second nominal current.

7. The protective device according to claim 1, wherein the second fuse circuit has at least two current paths, wherein each current path is adapted to transmit electrical energy to a respective electrical load, wherein an overcurrent protective device is arranged in each of the respective current paths.

8. The protective device according to claim 7, wherein the overcurrent protective device of each current path is adapted to trigger at a different nominal current such to prevent a current flow in that respective current path.

9. The protective device according to claim 1, wherein one or more of the first fuse circuit or the second fuse circuit is adapted to detect one or more of a component temperature or ambient temperature, and wherein the one or more of the first fuse circuit or the second fuse circuit is further adapted, when the component temperature or the ambient temperature reaches a temperature limit, to trigger the overvoltage protection circuit or to prevent a current flow from the voltage terminal to the electrical load.

10. The protective device according to claim 1, wherein the second fuse circuit is adapted to provide the electrical load with a reduced maximum electrical power compared to a composite comprising the first fuse circuit and the overvoltage protection circuit by limiting the line current to the second nominal current.

\* \* \* \* \*